(12) United States Patent
Matsunaga

(10) Patent No.: US 10,997,436 B2
(45) Date of Patent: May 4, 2021

(54) OBJECT DETECTION APPARATUS AND OBJECT DETECTION METHOD

(71) Applicant: DENSO CORPORATION, Kariya (JP)

(72) Inventor: Shogo Matsunaga, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 75 days.

(21) Appl. No.: 16/334,129

(22) PCT Filed: Sep. 15, 2017

(86) PCT No.: PCT/JP2017/033473
§ 371 (c)(1),
(2) Date: Mar. 18, 2019

(87) PCT Pub. No.: WO2018/056212
PCT Pub. Date: Mar. 29, 2018

(65) Prior Publication Data
US 2019/0370568 A1    Dec. 5, 2019

(30) Foreign Application Priority Data

Sep. 22, 2016    (JP) .............................. JP2016-184932

(51) Int. Cl.
*G06K 9/00* (2006.01)
*G06T 7/50* (2017.01)
(Continued)

(52) U.S. Cl.
CPC ............ *G06K 9/00805* (2013.01); *G01S 7/41* (2013.01); *G01S 13/867* (2013.01); *G01S 13/931* (2013.01);
(Continued)

(58) Field of Classification Search
CPC .. G06K 9/00805; G06K 2209/23; G06T 7/50; G06T 7/70; G06T 2207/10044;
(Continued)

(56) References Cited

U.S. PATENT DOCUMENTS 8,035,575 B2 * 10/2011 Okabe ....................... B60R 1/00
345/1.2
8,094,192 B2 * 1/2012 Kubota ................... G06T 15/20
348/148

(Continued)

FOREIGN PATENT DOCUMENTS

JP    2006-292475 A    10/2006
JP    2008-020276 A    1/2008
JP    2011-085476 A    4/2011

*Primary Examiner* — Gregory M Desire
(74) *Attorney, Agent, or Firm* — Maschoff Brennan

(57) ABSTRACT

An object detection apparatus detects an object present around an own vehicle by using a radar device and an imaging device. The object detection apparatus includes a type recognition section that recognizes a type of the object, based on an image captured by the imaging device, and a distance calculation section that calculates a distance to the object in a case where a single object is detected as the object by the imaging device and the radar device and where the object is recognized to be a bicycle by the type recognition section. The distance in this case is calculated taking account of a positional displacement between a front or rear end of the bicycle, whichever is nearer to the own vehicle, and a detection point on the object obtained through search waves transmitted from the radar device.

9 Claims, 5 Drawing Sheets

(51) Int. Cl.

| | |
|---|---|
| *G06T 7/70* | (2017.01) |
| *G01S 7/41* | (2006.01) |
| *G01S 13/86* | (2006.01) |
| *G01S 13/931* | (2020.01) |
| *G08G 1/16* | (2006.01) |

(52) U.S. Cl.
CPC .................. *G06T 7/50* (2017.01); *G06T 7/70* (2017.01); *G08G 1/166* (2013.01); *G06K 2209/23* (2013.01); *G06T 2207/10044* (2013.01); *G06T 2207/30261* (2013.01)

(58) Field of Classification Search
CPC ......... G06T 2207/30261; G01S 13/867; G01S 13/931; G08G 1/166
See application file for complete search history.

(56) References Cited

U.S. PATENT DOCUMENTS

| | | | | |
|---|---|---|---|---|
| 8,384,531 | B2* | 2/2013 | Szczerba | G01S 13/931 340/435 |
| 8,466,827 | B2* | 6/2013 | Nanami | G01S 13/426 342/70 |
| 8,503,265 | B2* | 8/2013 | Akiyama | G01S 15/46 367/93 |
| 9,223,013 | B2* | 12/2015 | Stein | G06T 7/55 |
| 9,254,842 | B2* | 2/2016 | Ishida | B60W 30/0956 |
| 9,435,879 | B2* | 9/2016 | Hayasaka | G08G 1/16 |
| 9,481,364 | B2* | 11/2016 | Akiyama | B60W 30/09 |
| 9,620,009 | B2* | 4/2017 | Hayasaka | G08G 1/166 |
| 10,627,228 | B2* | 4/2020 | Takemura | G01C 3/06 |
| 2017/0220874 | A1* | 8/2017 | Ayvaci | G06K 9/00791 |
| 2019/0370568 | A1* | 12/2019 | Matsunaga | G06K 9/00805 |

* cited by examiner (a)

(b)

OBJECT DETECTION APPARATUS AND OBJECT DETECTION METHOD

CROSS REFERENCE TO RELATED APPLICATIONS

The present application is a national stage application of PCT Application No. PCT/JP2017/033473, filed on Sep. 15, 2017, which and claims the benefit of priority from earlier Japanese Patent Application No. 2016-184932 filed Sep. 22, 2016, the description of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to an object detection apparatus and an object detection method, and more specifically to an object detection apparatus that detects an object present around an own vehicle by using a radar device and an imaging device, and to an object detection method.

BACKGROUND ART

Vehicle systems that perform driving support control are known. Such vehicle systems use an imaging device or a radar device to detect an object present around the vehicle. Based on the results of the detections, various kinds of driving support control are performed, including collision avoidance control, inter-vehicle distance control, and following travel control (e.g., see PTL 1). PTL 1 discloses use of position information of an object detected by the radar device and position information of an object detected by the imaging device. These pieces of position information, if the relationship therebetween satisfies a criterion, are determined to indicate a single (the same) object, and this object is taken to be an object to be detected.

CITATION LIST

Patent Literature

PTL 1: JP 2006-292475 A

SUMMARY OF THE INVENTION

When an object present around the own vehicle is a vehicle or a motorcycle, the object should have a front or rear end made of metal with some width. Therefore, the radar device should receive reflected waves having comparatively high radio field intensity. In this case, in a situation that a front or rear end of an object is located nearest to the own vehicle, the end can be detected by the radar device and a shortest distance to the object can be accurately detected by the radar device. However, if the object is a bicycle, such an object in general has a front or rear end made of metal (e.g., mudguard for the rear wheel, etc.) with a small width. Therefore, the waves reflected from the end of the bicycle should have low radio field intensity. Accordingly, the reflection data of the front or rear end of the object is less likely to be considered, and thus there is a concern that a shortest distance to an object will not be detected with high accuracy.

The present disclosure has been made in light of the issues set forth above and aims to provide an object detection apparatus that can accurately recognize a shortest distance to an object present around an own vehicle if the object is a bicycle, and to provide an object detection method.

To solve the above issues, the present disclosure adopts the following means.

The present disclosure relates to an object detection apparatus that detects an object present around the own vehicle by using a radar device and an imaging device. An object detection apparatus according to an aspect of the present disclosure includes a type recognition section and a distance calculation section. The type recognition section recognizes a type of the object, based on an image captured by the imaging device. The distance calculation section calculates a distance to the object in a case where a single object is detected as the object by the imaging device and the radar device and where the object is recognized to be a bicycle by the type recognition section. The distance in this case is calculated taking account of a positional displacement between a front or rear end of the bicycle, whichever is nearer to the own vehicle, and a detection point on the object obtained through search waves transmitted from the radar device.

It is so configured that, if the radar device and the imaging device detect a single object, and if the object is a bicycle, a distance to the object is calculated taking account of the positional displacement between a front or rear end of the bicycle, whichever is nearer to the own vehicle, and a detection point on the object detected by the radar device. A bicycle, as an object, has a rear end or a front end that is narrow and made of metal. Accordingly, the waves reflected from the front or rear end of the bicycle have low radio field intensity. If the front or rear end of the bicycle is located nearest to the own vehicle, there is a concern that a shortest distance to a target object cannot be accurately detected by the radar device. In this regard, according to the configuration set forth above, a distance to the bicycle is calculated taking account of a positional displacement between a front or rear end of the bicycle, whichever is nearer to the own vehicle, and a detection point on the object detected by the radar device. Thus, in a situation that the front or rear end of the bicycle is located nearest to the own vehicle, a shortest distance to the bicycle can be recognized with high accuracy.

BRIEF DESCRIPTION OF THE DRAWINGS

Referring to the accompanying drawings, a specific description will be given of the present disclosure to clarify the above object and other objects, characteristics, and advantageous effects of the present disclosure. In the drawings.

DESCRIPTION OF THE EMBODIMENTS

Figure 1:
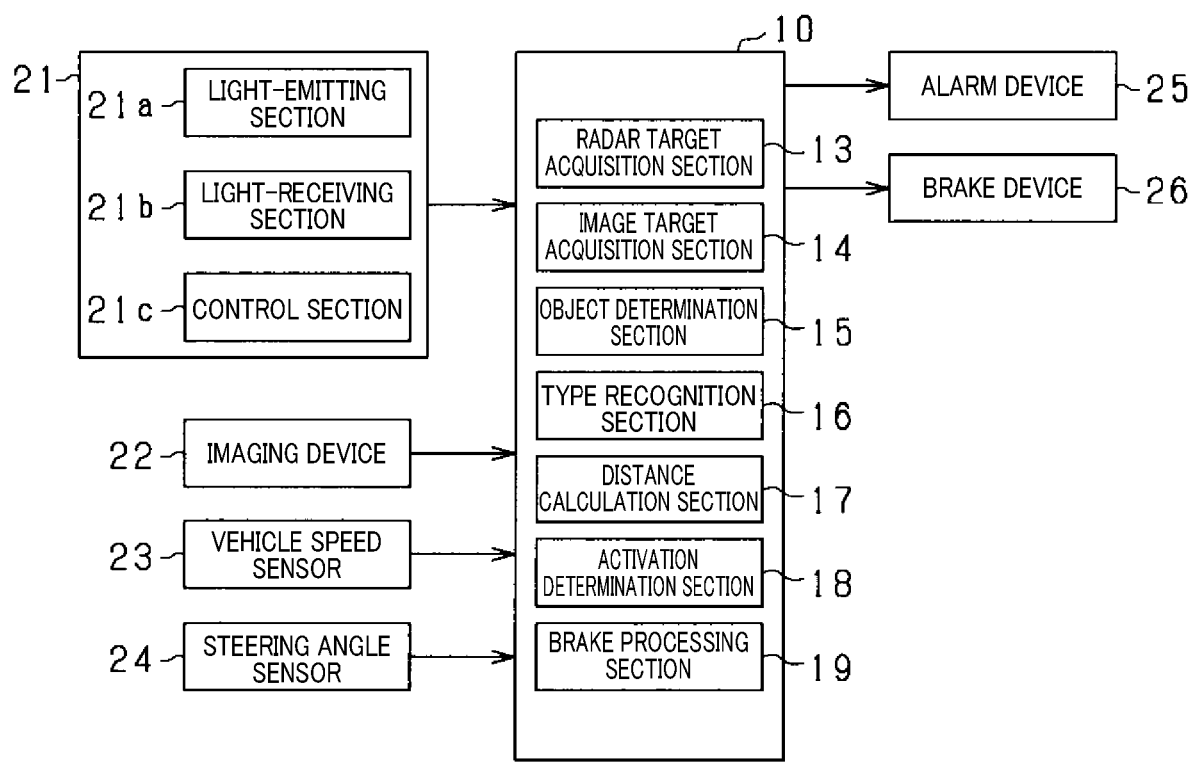
FIG. 1 is a schematic diagram illustrating a configuration of a driving support system.

With reference to the drawings, some embodiments of an object detection apparatus will be described. In the following embodiments, components that are the same or equivalent to each other are given the same reference signs in the drawings. For the components having the same reference signs, descriptions in the specification should be referred to.

First Embodiment

First, a first embodiment will be described. An object detection apparatus is applied to an in-vehicle driving support apparatus as part of the apparatus to support driving of the own vehicle. The driving support apparatus serves as a precrash safety system (PCS). The precrash safety system performs various kinds of control to avoid a collision of the own vehicle with an object, or mitigate damage that would be caused by the collision, by detecting an object present around the own vehicle and supporting driving by activating in-vehicle safety devices.

FIG. 1 shows a driving support apparatus 10 that is a computer provided with a CPU, a ROM, a RAM, an I/O, and other components. The CPU executes a program installed in the ROM to implement various functions. The driving support apparatus 10 is connected to a radar device 21 and an imaging device 22, which serve as object detection sensors that detect an object present around the own vehicle. The driving support apparatus 10 receives detection information of the object from these object detection sensors.

The radar device 21, for example, is a known millimeter-wave radar that uses high frequency signals of a millimeter-wave band as transmission waves. In the present embodiment, the radar device 21 is provided to the front end of the own vehicle. The radar device 21 includes a light-emitting section 21a, a light-receiving section 21b, and a control section 21c, and detects an object, based on a time period until search waves emitted from the light-emitting section 21a to be reflected, as reflected waves, by an object and received by the light-receiving section 21b.

The control section 21c detects a plurality of reflection points, based on the reflected waves received by the light-receiving section 21b. Of the plurality of detected reflection points, those which satisfy predetermined conditions (e.g., conditions based on a lateral position, a relative speed, and the like) are taken to be reflection points that have caused reflection from the same object and are grouped into one segment. Then, from the data of the grouped reflection points of each segment, object information is acquired. In this case, from the plurality of grouped reflection points belonging to a segment, a segment typical point is selected for each segment, as a point typifying a target (radar target). In the present embodiment, a segment typical point is extracted based on radio field intensity. A reflection point exhibiting highest radio field intensity is extracted as a segment typical point.

The control section 21c outputs data including the coordinates of each segment typical point and distance information, as ranging data, to the driving support apparatus 10. The distance information indicates distances from the segment typical point to individual segment members in the same segment. Using the ranging data inputted from the radar device 21, the driving support apparatus 10 calculates a distance to each segment typical point, as a distance to an object measured by the radar device 21 (also termed "radar-detected distance L" hereinafter). The radar-detected distance L may be calculated by the control section 21c.

For example, the imaging device 22 may be a CCD camera, a CMOS image sensor, or a near-infrared camera. The imaging device 22 is attached to the vehicle at a predetermined level so as to be located at the center of the vehicle in the vehicle width direction, and captures an image, from a bird's eye viewpoint, of a region extending ahead of the vehicle over a predetermined angular range. The data of an image captured by the imaging device 22 is outputted to the driving support apparatus 10.

The vehicle also includes various sensors detecting a traveling state of the vehicle. These sensors include a vehicle speed sensor 23 for detecting a vehicle speed, a steering angle sensor 24 for detecting a steering angle of the steering wheel, and other sensors. The vehicle further includes safety devices for avoiding a collision between the own vehicle and an object, or mitigating damage that would be caused by the collision. As such safety devices, an alarm device 25, and a brake device 26 are provided. The alarm device 25, for example, is a speaker or a display installed in the interior of the own vehicle. Safety devices are not limited to these devices, but may include, for example, a seatbelt device for taking up the seatbelt provided to each seat of the own vehicle, a steering device for automatically steering the steering wheel, and other devices.

The driving support apparatus 10 causes the PCS to perform various kinds of control, based on the detection information acquired from the radar device 21 and the imaging device 22. Specifically, the driving support apparatus 10 calculates a time to collision (TTC), which is a time period until the own vehicle would collide with an object, by dividing a distance to the object calculated based on the ranging data of the radar device 21 by a relative speed. A time to collision may be calculated using a relative acceleration in addition to the relative speed, assuming that the own vehicle approaches the object in a linear motion with constant acceleration. Then, if the calculated time to collision is not more than a preset activation timing threshold, a safety device suitable for the possible collision is activated.

Specifically, the driving support apparatus 10 activates the alarm device 25 if the time to collision is less than a preset first threshold TH1, and activates the brake device 26 if the time to collision is less than a second threshold TH2 to automatically apply the brake. When the brake device 26 is activated, the alarm device 25 may also be activated together. The second threshold TH2 is set to a time shorter than the first threshold TH1, and thus the alarm device 25 is activated earlier than the brake device 26.

Figure 2:
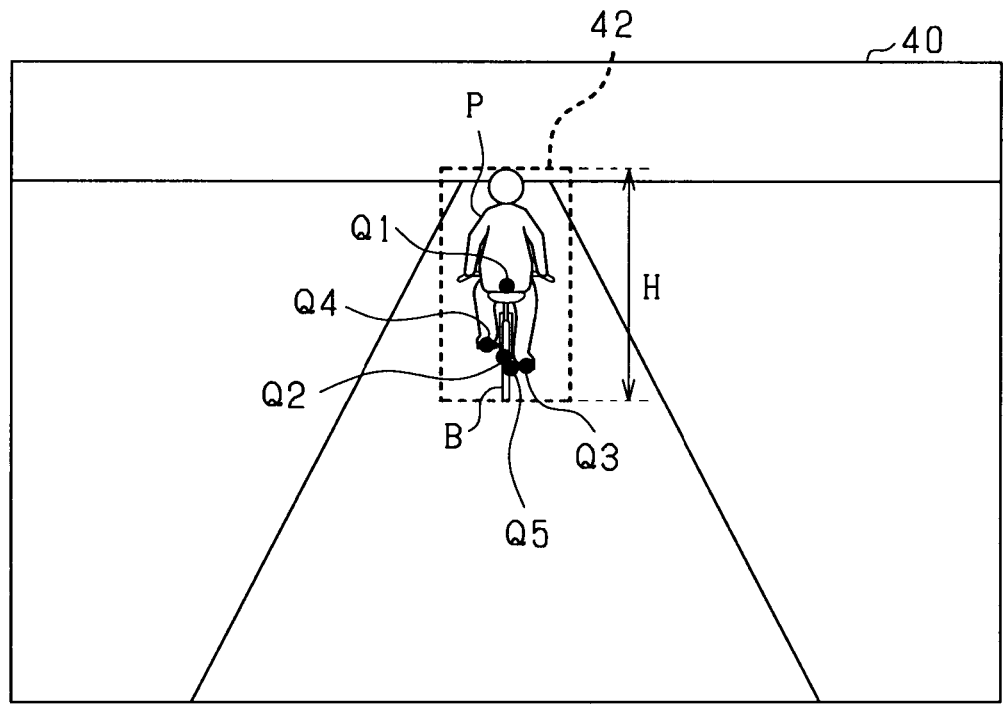
FIG. 2 is a set of diagrams illustrating a case where an imaging device and a radar device have detected a bicycle.
Figure 2:
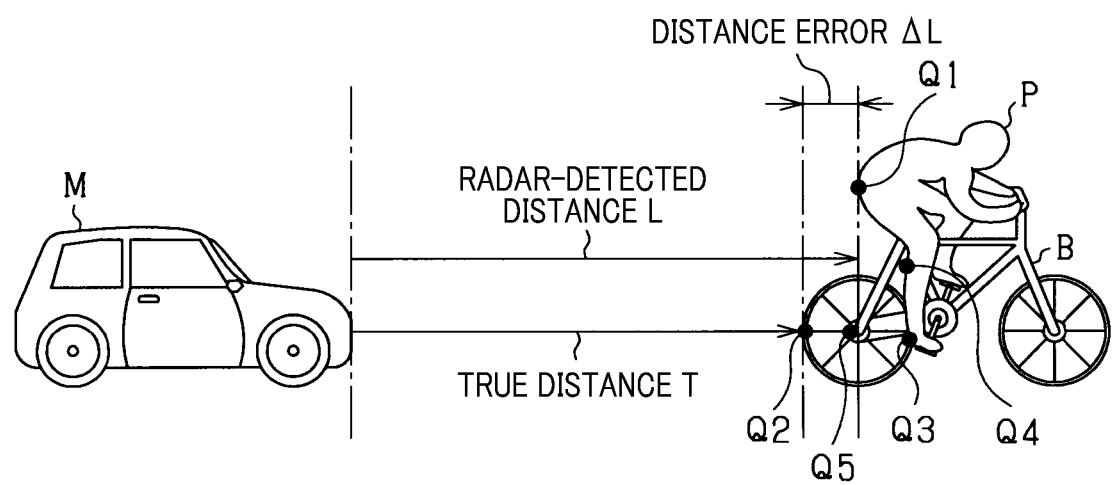

Referring now to FIG. 2, a description will be given of the case where a bicycle present ahead of the own vehicle is detected by the radar device 21 and the imaging device 22. In FIG. 2, (a) is a diagram illustrating an image 40 captured by the imaging device 22, and (b) is a diagram schematically illustrating, in side view, a relationship between an own vehicle M and a bicycle B. In FIG. 2, Q1 to Q5 indicate reflection points of the search waves transmitted from the radar device 21 in the forward direction.

FIG. 2 assumes a situation where the bicycle B running ahead of the own vehicle M and a rider P of the bicycle B are detected by the radar device 21 through the plurality of reflection points Q1 to Q5. These plurality of reflection points Q1 to Q5 are determined to have been grouped into one segment by a grouping process.

The radar device 21 receives reflected waves with radio field intensity that depends on the width of an effective reflection surface. An effective reflection surface having a larger width allows the reflected waves to exhibit higher radio field intensity. Since the bicycle B is an object having a rear end (e.g., a mudguard of the rear wheel) with a small width, the reflection from the reflection point Q2 on the rear end of the bicycle exhibits low radio field intensity. Therefore, the reflection point Q1 on the rider P, for example, which is located farther from the own vehicle M than the rear end is, may be selected as a segment typical point. In this case, despite the distance to the rear end of the bicycle being actually the shortest, the driving support apparatus 10 may recognize the distance to the rider P located further forward than the rear end, as being a distance between the own vehicle and the object.

In this case, as shown in FIG. 2(b), due to inclusion of a distance error ΔL, a distance longer than a true distance T to the object is recognized as being a radar-detected distance L. This may cause a delay in starting collision avoidance control for the bicycle present ahead of the own vehicle, and therefore there is a concern that appropriate control may not be performed for avoiding a collision or mitigating damage that would be caused by the collision.

In the present embodiment, the radar-detected distance L is corrected, if an object is detected by both the imaging device 22 and the radar device 21 and the object is recognized to be a bicycle from the captured image. The correction in this case is made taking account of a positional displacement between a front or rear end of the bicycle, whichever is nearer to the own vehicle (in FIG. 2, the rear end of the bicycle B), and a detection point on the object obtained through the search waves transmitted from the radar device 21. The "detection point on the object obtained through the search waves transmitted from the radar device 21" herein refers to a position associated with the radar-detected distance L measured by the radar device 21. In the present embodiment, the detection point corresponds to a segment typical point. The amount of displacement between the rear end of the bicycle and the detection point corresponds to the distance error ΔL.

Specifically, as shown in FIG. 1, the driving support apparatus 10 includes a radar target acquisition section 13, an image target acquisition section 14, an object determination section 15, a type recognition section 16, a distance calculation section 17, an activation determination section 18, and a brake processing section 19. It should be noted that the radar target acquisition section 13, the image target acquisition section 14, the object determination section 15, the type recognition section 16, and the distance calculation section 17 configure the object detection apparatus, and that the activation determination section 18, and the brake processing section 19 configure the collision avoidance device.

The radar target acquisition section 13 acquires ranging data at predetermined cycles from the radar device 21, and produces radar target information for each segment. The radar target information includes information on physical quantities of an object, such as a radar-detected distance L, a lateral position of the object, and a relative speed.

The image target acquisition section 14 acquires image data at predetermined cycles from the imaging device 22, and produces information on an object included in the captured image (also termed "image target information" hereinafter), by analyzing the acquired image data. The image target information includes information on a distance to the object, and a relative speed, a lateral position, a height, and the like of the object. The image target acquisition section 14 extracts a detection region 42 for an image target from an image 40, and calculates various physical quantities, such as a distance to the object, and a lateral position, a relative speed, a height, and the like of the object, based on the position of the extracted detection region 42.

The object determination section 15 determines whether a single (the same) object is being detected by both the imaging device 22 and the radar device 21, based on the radar target information inputted from the radar target acquisition section 13, and the image target information inputted from the image target acquisition section 14. The image object determination section 15 determines that the image target and the radar target are the same, if they are in a predetermined positional relationship.

The type recognition section 16 recognizes type of an object, based on the image data. The type recognition section 16 performs pattern matching for the detection region 42 extracted from the image 40 (see FIG. 2(a)) by using a predetermined pattern to thereby identify whether the target is a vehicle (four-wheel vehicle, motorcycle, etc.), a pedestrian, a bicycle, or an obstacle. Also, the type recognition section 16 determines the orientation of the target relative to the traveling direction of the own vehicle. For example, if the image target is a bicycle, it is determined whether the bicycle is in a longitudinal state where the wheels are arranged in the front-back direction relative to the traveling direction of the own vehicle, or in a lateral state where the wheels are arranged in the left-right direction relative to the traveling direction of the own vehicle. If the bicycle is obliquely oriented relative to the traveling direction of the own vehicle, the bicycle is determined to be in a longitudinal state, as long as the front or rear end of the bicycle is located nearest to the own vehicle.

The distance calculation section 17 corrects the radar-detected distance L based on the distance error ΔL by performing a bicycle distance correction process, if predetermined correction conditions are satisfied. In the present embodiment, the distance calculation section 17 uses a correction amount for the radar-detected distance L (also termed "distance correction amount A" hereinafter) to calculate a correction value Lk for the radar-detected distance L through the following Formula (1).

Correction value $Lk$=Radar-detected distance $L$−Distance correction amount $A$ (1)

The correction conditions include the following items (A) to (C). If all these items (A) to (C) are satisfied, bicycle distance correction is executed.
(A) That a single object is being detected by both the imaging device 22 and the radar device 21.
(B) That the single object recognized in the item (A) is a bicycle.
(C) That the bicycle of the item (B) is in a longitudinal state where the wheels are arranged in the front-back direction relative to the traveling direction of the own vehicle.

Figure 3:
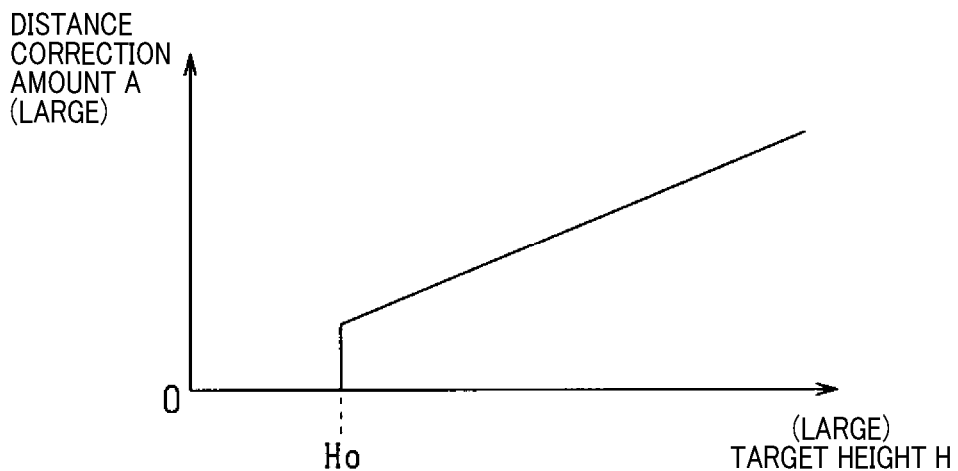
FIG. 3 is a diagram illustrating a relationship between a target height and a distance correction amount.

In view of the fact that the distance error ΔL depends on a height H of the target, the distance calculation section 17 calculates a distance correction amount A, based on the height H of the target acquired through image recognition. Specifically, as shown in FIG. 3, the distance calculation section 17 determines a larger value for the distance correction amount A, as the height H of the target is larger. This is because the target having a larger height H means that the wheels of the bicycle B have a larger diameter accordingly and thus the distance error ΔL becomes larger accordingly. In FIG. 3, Ho indicates a value corresponding to a minimum height in the case where the target resulting from image recognition is a bicycle.

Figure 4:
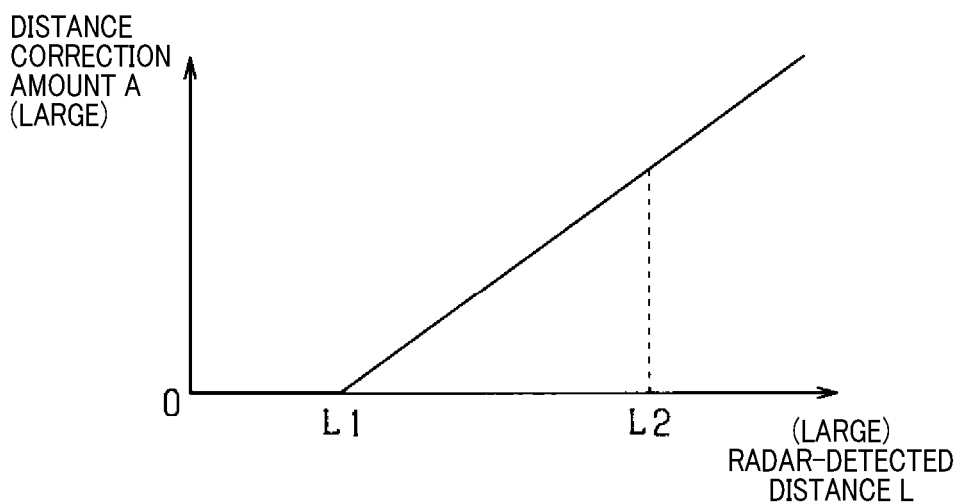
FIG. 4 is a diagram illustrating a relationship between a radar detected distance and a distance correction amount.

Furthermore, the distance calculation section 17 determines a distance correction amount A according to the radar-detected distance L. This is because, if the object is within a short distance, there is a probability that the distance to the rear end of the bicycle has been detected as a radar-detected distance L. Specifically, as shown in FIG. 4, as the radar-detected distance L becomes smaller, a smaller value is determined as the distance correction amount A. According to FIG. 4, for the single target having a height H, a comparatively large value is determined as the distance correction amount A if the radar-detected distance L is a far distance L2, and a comparatively small value is determined (zero in FIG. 4) as the distance correction amount A if the radar-detected distance L is a close distance L1 (<L2).

If a predetermined time period has not elapsed from the start of the collision avoidance control, the distance calculation section 17 limits the amount of change per unit time in the distance correction amount A. If the distance information of an object is abruptly changed from the radar-detected distance L to the correction value Lk when starting the bicycle distance correction, the distance to the object recognized by the driving support apparatus 10 may instantaneously greatly change in a decrementing manner depending on the distance correction amount A, causing a "distance discontinuity". The reason why the above limitation is made is that, during automatic application of brakes in such a case under the collision avoidance control, for example, the distance to the object may be instantaneously reduced resulting in that the braking force of the vehicle is greatly changed, and the driver may feel uneasy.

Figure 5:
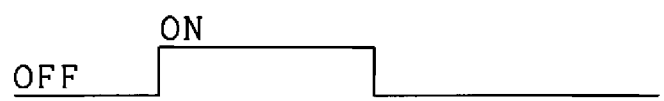
FIG. 5 is a set of diagrams illustrating a distance correction amount in a predetermined time period from start of correction.
Figure 5:
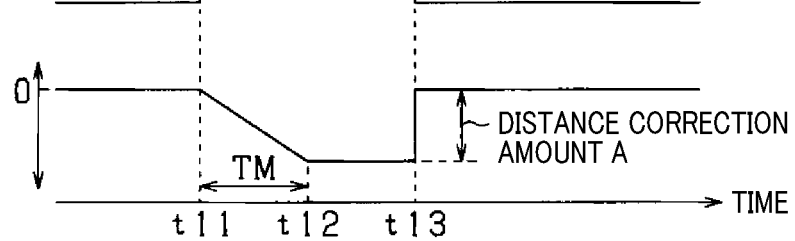

Specifically, as shown in FIG. 5, the amount of change per unit time in the distance correction amount A is limited until a lapse of a predetermined time TM from time t11 when a bicycle distance correction flag F2 is switched from off to on, so that the distance correction amount A is gradually changed in an incrementing manner. In this case, the predetermined time TM may be fixed, and the amount of change per unit time may be determined based on the height H of the target and the distance correction amount A suitable for the radar-detected distance L. Alternatively, the amount of change per unit time may be fixed. The bicycle distance correction flag F2 indicates allowance or non-allowance of correction of the radar-detected distance L which is based on the distance error ΔL. If the correction is allowed, the flag F2 is turned on.

The activation determination section 18 calculates a time to collision (TTC), and determines whether the time to collision is not more than an activation timing threshold. If the object present around the own vehicle is a bicycle in a longitudinal state, the activation determination section 18 receives a correction value Lk of the radar-detected distance L from the distance calculation section 17, and calculates a time to collision, based on the correction value Lk. The activation timing threshold includes the first threshold TH1 used for determining activation of the alarm device 25, and the second threshold TH2 used for determining activation of the brake device 26.

The brake processing section 19 receives a signal indicating the time to collision being not more than the activation timing threshold, from the activation determination section 18, and then, based on the signal, transmits a control command to the safety devices, such as the alarm device 25, the brake device 26, or other safety devices. The safety devices are activated based on the control command. Specifically, the alarm device 25 issues an alarm to notify the driver of the danger, or the brake device 26 automatically applies the brake. While brakes are automatically applied to the own vehicle, the brake processing section 19 performs distance feedback control using the radar-detected distance L so that a predetermined distance or more is ensured between the own vehicle and the object.

Referring to the flow diagrams of FIGS. 6 to 8, a description will be given of driving support control according to the present embodiment.

First, referring to the flow diagram of FIG. 6, the bicycle distance correction process will be described. This process is performed by the CPU of the driving support apparatus 10 at predetermined cycles.

Figure 6:
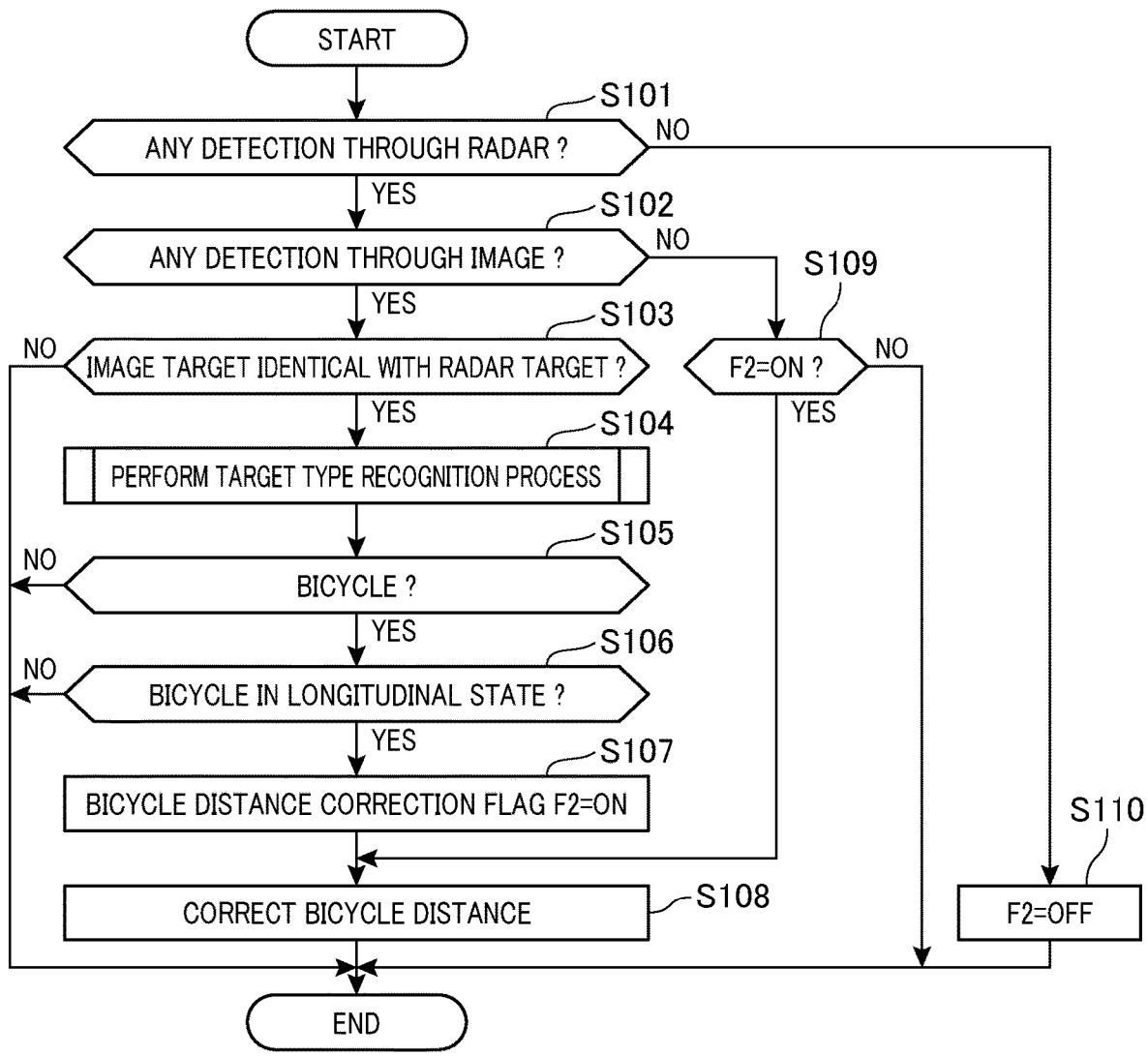
FIG. 6 is a flow diagram illustrating a procedure of a bicycle distance correction process.

In FIG. 6, the CPU determines, at step S101, whether an object is being detected by the radar device 21, i.e., whether there is a radar detection. Then, at step S102, the CPU determines whether an object is being detected by the imaging device 22, i.e., whether there is an image detection. If affirmative determinations are made at steps S101 and S102, the present control proceeds to step S103 where it is determined whether the image target is identical with the radar target (object determination section). If the targets are determined to be identical at step S103, the present control proceeds to step S104 where a target type recognition process of FIG. 7 is performed.

Figure 7:
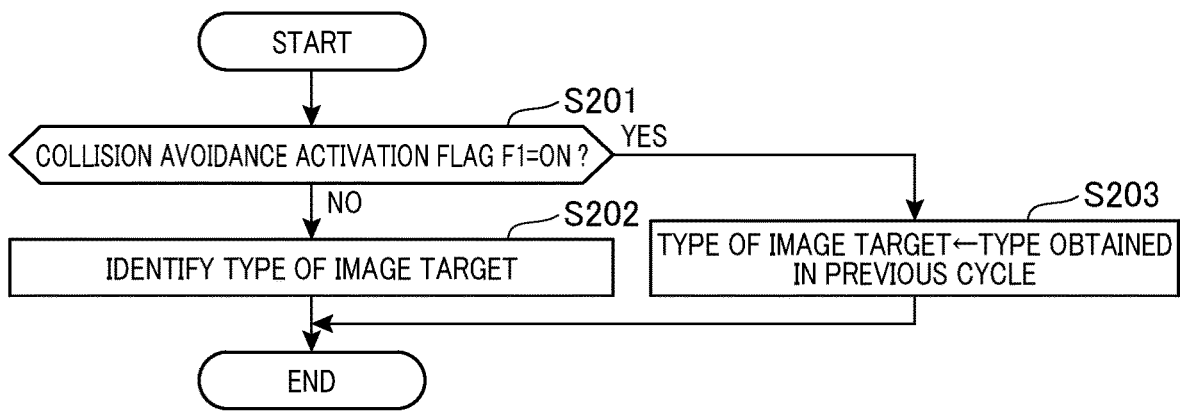
FIG. 7 is a flow diagram illustrating a procedure of a target type recognition process.

As shown in FIG. 7, the CPU determines, at step S201, whether a collision avoidance activation flag F1 is in an on state. The collision avoidance activation flag F1 indicates whether the safety devices are being activated under collision avoidance control, and is turned on while the safety devices are being activated. If the collision avoidance activation flag F1 is in an off state, i.e., if the safety devices are not being activated, the present control proceeds to step S202 where the CPU uses the image target as a basis to recognize the type of the object that is being detected by both the radar device 21 and the imaging device 22 (type recognition section).

If the collision avoidance activation flag F1 is in an on state, the present control proceeds to step S203 where the information associated with the type of the image target is kept (latched) as it is as obtained in the previous cycle. The information is kept (latched), while the collision avoidance control is performed, for the purpose of preventing the occurrence of hunting in the distance information of the own vehicle and the object due to switching between necessity and unnecessity of correcting the radar-detected distance L with the change in target type. Accordingly, after starting the bicycle distance correction, even if the type of the target subjected to the collision avoidance control is changed from a bicycle to a vehicle after start of the collision avoidance control, the bicycle distance correction is continuously performed by keeping the target type to be a bicycle.

Referring back to FIG. 6, at the subsequent step S105, it is determined whether the type of the object after image recognition is a bicycle. If the image target is a bicycle, the present control proceeds to step S106 where it is determined whether the bicycle is in a longitudinal state. If the bicycle is in a longitudinal state, an affirmative determination is made at step S106. Then, the present control proceeds to step S107 where the bicycle distance correction flag F2 is turned on.

At succeeding step S108, the CPU acquires a radar-detected distance L from the radar device 21, as a measurement of a distance to the object, and corrects the radar-detected distance L, based on the distance error ΔL (distance calculation section). Specifically, using the maps shown in FIGS. 3 and 4, the CPU calculates a distance correction amount A according to the height H of the target recognized from the image target and the radar-detected distance L, and calculates a correction value Lk for the radar-detected distance L by subtracting the distance correction amount A from the radar-detected distance L. It should be noted that the distance correction amount A is gradually changed before a lapse of the predetermined time TM from the time point of starting the collision avoidance control. The calculated correction value Lk corresponds to distance information of an object and is used, for example, for calculating a time to collision. Then, the present routine is temporarily terminated.

After the start of the bicycle distance correction process, the bicycle targeted for distance detection may be no longer detected by the imaging device 22, while the bicycle is still continuously being detected by the radar device 21. In this case, if the bicycle distance correction is immediately stopped while the bicycle is only temporarily lost from the image, hunting may occur in the distance information of the own vehicle and the object, by switching correction of the radar-detected distance L between necessity and unnecessity. In this regard, in the present embodiment, the bicycle distance correction is continued, as long as the bicycle targeted for distance detection is continuously being detected by the radar device 21.

As stated above, after the start of the bicycle distance correction process, the bicycle targeted for distance detection may no longer be detected by the imaging device 22, while the bicycle is still continuously being detected by the radar device 21. In this case, specifically, an affirmative determination is made at step S101, and a negative determination is made at step S102. After that, the present control proceeds to step S109 where it is determined whether the bicycle distance correction flag F2 is in an on state. Since the bicycle distance correction process has already been started, an affirmative determination is made at step S109. Then, the present control proceeds to step S108 where the bicycle distance correction process is performed.

If the bicycle as a target of distance detection is no longer detected by the radar device 21, a negative determination is made at step S101. Then, control proceeds to step S110 where the bicycle distance correction flag F2 is turned off. Subsequently, the present processing is terminated.

Referring to the flow diagram of FIG. 8, a description will be given of a procedure of a collision avoidance process. This process is performed by the CPU of the driving support apparatus 10 at predetermined cycles.

Figure 8:
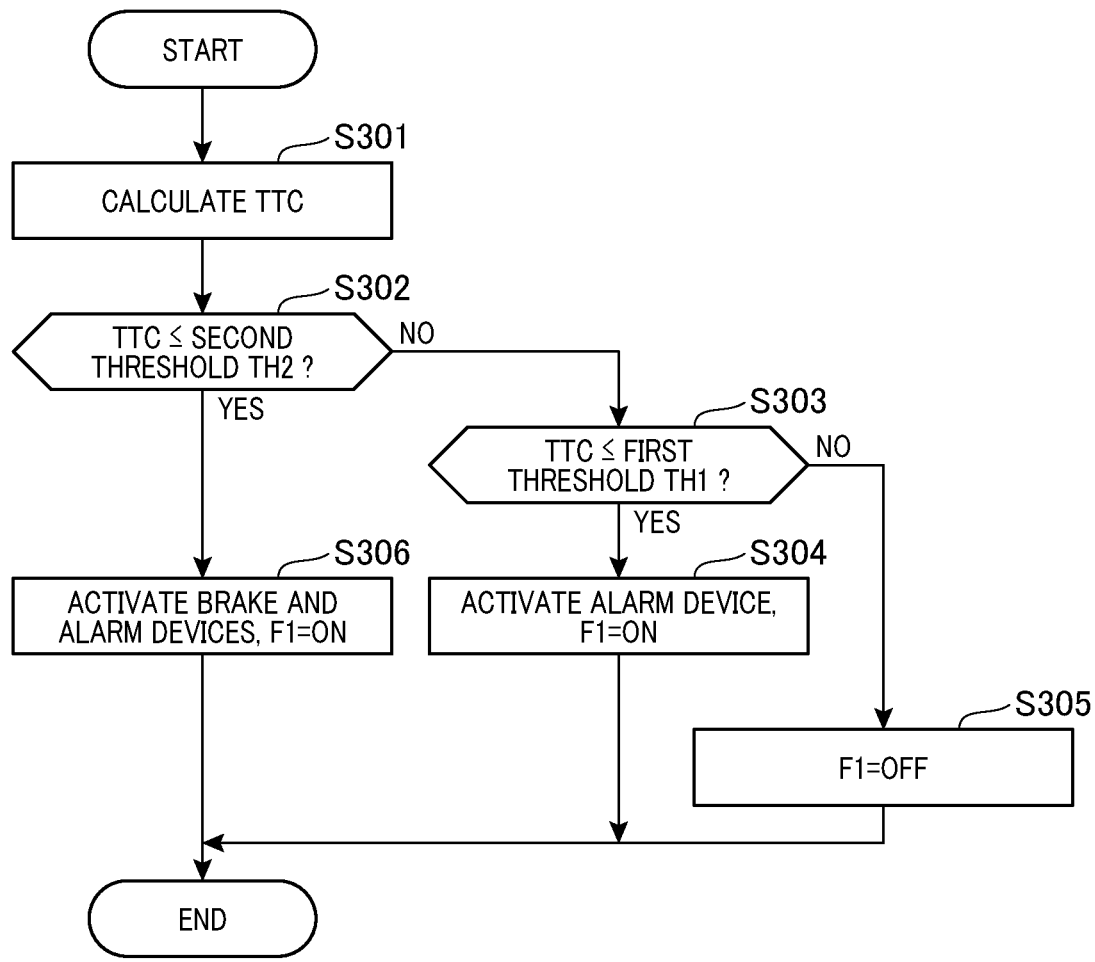
FIG. 8 is a flow diagram illustrating a procedure of collision avoidance control.

In FIG. 8, the CPU calculates, at step S301, a time to collision (TTC), based on the distance information of an object. If the object currently detected by the radar device 21 and the imaging device 22 is a bicycle in a longitudinal state, the CPU calculates a time to collision based on the correction value Lk of the radar-detected distance L. At the subsequent step S302, it is determined whether the time to collision is not more than the second threshold TH2.

If the time to collision is more than the second threshold TH2, the present control proceeds to step S303 where it is determined whether the time to collision is equal to or less than the first threshold TH1. If an affirmative determination is made at step S303, the present control proceeds to step S304 where the alarm device 25 is activated, and the collision avoidance activation flag F1 is turned on. If a negative determination is made at step S303, the present control proceeds to step S305 where the collision avoidance activation flag F1 is turned off.

If the time to collision is not more than the second threshold TH2, a negative determination is made at step S302, and then the present control proceeds to step S306. At step S306, the CPU activates the brake device 26 and the alarm device 25, and turns on the collision avoidance activation flag F1. Then, the present routine is temporarily terminated.

According to the present embodiment specifically described above, the following advantageous effects are obtained.

In the configuration of the present embodiment, if an object present ahead of the own vehicle M is a bicycle B in a longitudinal state relative to the own vehicle M, a distance to the object is calculated considering the positional displacement between the rear end of the bicycle B and a detection point (segment typical point) on the object derived from the radar device 21. The bicycle B as an object has the rear end made of metal with a small width. Therefore, the waves reflected from the rear end of the bicycle B will have low radio field intensity and thus the rear end is less likely to be extracted as a segment typical point. Thus, there is a concern that accurate detection of a shortest distance to an object is not necessarily performed by the radar device 21. In this regard, in the configuration set forth above, a distance to an object is calculated considering the positional displacement between the rear end of the bicycle B and a detection point on the object derived from the radar device 21. Accordingly, the shortest distance to the bicycle B can be ascertained with high accuracy.

Specifically, in the configuration of the present embodiment, a distance to an object is calculated by correcting the radar-detected distance L taking account of the positional displacement between the rear end of the bicycle and a detection point on the object derived from the radar device 21. If the object present ahead of the own vehicle is a bicycle in a longitudinal state, there may be a positional displacement corresponding to a distance error $\Delta L$, as shown in FIG. 2(b), in the part of the bicycle nearest to the object, relative to the radar-detected distance L that is a distance measured by the radar device 21. In view of this point, the radar-detected distance L is corrected taking account of the positional displacement corresponding to the distance error $\Delta L$. With this correction, a shortest distance to the object can be highly accurately calculated as a distance to an object.

As an object has a larger height, the wheels of the bicycle B will each have a larger diameter accordingly, making the positional displacement larger accordingly between the rear end of the bicycle and a detection point (segment typical point) derived from the radar device 21. In view of this point, the embodiment of the present embodiment is so configured that a distance correction amount A is calculated according to the target height H acquired through image recognition, and the radar-detected distance L is corrected based on this distance correction amount A. With this configuration, a radar-detected distance L can be corrected based on a distance correction amount A which is suitable for the object. Thus, the accuracy of calculating a shortest distance to an object is enhanced.

The embodiment of the present embodiment is so configured that as the radar-detected distance L becomes smaller, the distance correction amount A is made smaller. If an object is within a short distance, there is a probability that the distance to the rear end of a bicycle has been detected as a radar-detected distance L. Thus, with the configuration set forth above, a radar-detected distance L can be corrected, taking account of whether there is a likelihood of producing a distance error $\Delta L$.

The embodiment of the present embodiment is so configured that, while collision avoidance control is performed, the information associated with the type of the image target is kept as it is as obtained in the previous cycle to keep the object type at the start of the collision avoidance control. With this configuration, the bicycle distance correction is ensured not to be switched between necessary and unnecessary due to the change in target type while the collision avoidance control is performed. Thus, occurrence of hunting is prevented in a distance to the object during the collision avoidance control, or further, the collision avoidance control is appropriately performed.

In the configuration of the present embodiment, the amount of change per unit time in the distance correction amount A is limited until lapse of the predetermined time TM from the start of the bicycle distance correction based on the distance error ΔL, thereby limiting the amount of change per unit time in distance to the object. This configuration can prevent the occurrence of a distance discontinuity of instantaneously and greatly changing a distance to an object.

In the configuration of the present embodiment, if an object is no longer detected by the imaging device 22 after start of correction based on the distance error ΔL, the correction is continued as long as the radar device 21 is continuously detecting the object. There may be a situation in which the radar device 21 is continuously detecting an object but the imaging device 22 no longer detects the object. In this case, if bicycle distance correction is immediately stopped while the bicycle is only temporarily lost from the image, there is a concern that the distance information of the object may vary. In view of this, the configuration set forth above can prevent variation in distance information while the collision avoidance control is performed.

In the configuration of the present embodiment, the orientation of a bicycle relative to the own vehicle is considered, i.e., it is determined whether the bicycle is in a longitudinal state and, if the bicycle is determined to be in a longitudinal state, the radar-detected distance L is corrected based on the distance error ΔL. The distance error ΔL does not have to be taken into account if the bicycle is in a lateral state where the wheels are arranged along the left-right direction relative to the traveling direction of the own vehicle. Thus, by performing the correction under the condition that the bicycle is in a longitudinal state, accuracy of calculating a distance to an object can be ensured.

Second Embodiment

Next, a second embodiment will be described. The first embodiment has been so configured that, if the object present ahead of the own vehicle is a bicycle, a distance to the object is calculated by correcting the radar-detected distance L based on the distance error ΔL. In this regard, in the present embodiment, if the object present ahead of the own vehicle is a bicycle, a reflection point on a front or rear end of the bicycle, whichever is nearer to the own vehicle, is extracted from among a plurality of reflection points detected by the radar device 21, and a distance to the object is calculated based on the extracted reflection point. Thus, a distance to an object is calculated taking account of the positional displacement between the rear end of the bicycle and the detection point on the object.

Figure 9:
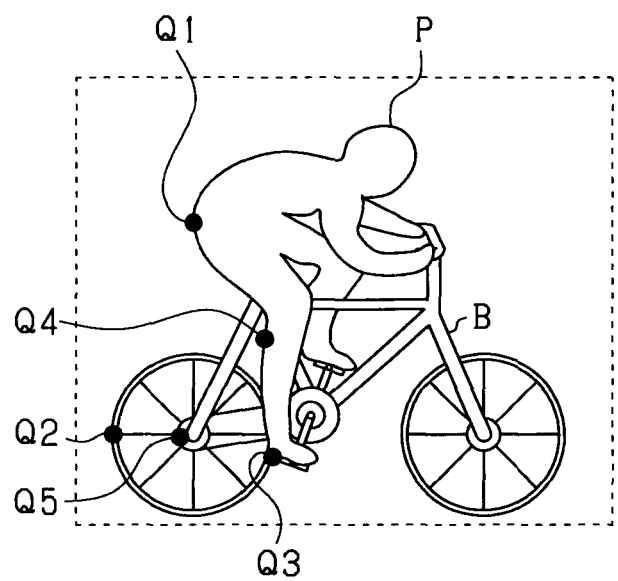
FIG. 9 is a diagram illustrating calculation of a distance to an object according to a second embodiment.

FIG. 9 shows a bicycle B in a longitudinal state running ahead of the own vehicle, with indication of a plurality of reflection points Q1 to Q5 detected by the radar device 21. Among the plurality of reflection points Q1 to Q5, the control section 21c of the radar device 21 takes the reflection point Q1 having a large area and highest reflection intensity to be a segment typical point, and takes the remaining reflection points Q2 to Q5 to be segment members. In this case, the distance to a position which is located further forward than is the reflection point Q2 on the rear end of the bicycle B, i.e. the distance to the reflection point Q1, is erroneously determined to be a distance to an object.

In view of this, in the present embodiment, the distance calculation section 17 extracts a reflection point on a front or rear end of the bicycle, whichever is nearer to the own vehicle, i.e., a reflection point nearest to the own vehicle, from among the plurality of reflection points Q1 to Q5 detected by the radar device 21. Which of the reflection points Q1 to Q5 is nearest to the own vehicle is determined based on the coordinates of the segment typical point included in the ranging data, and the distance information indicating distances to the individual segment members from the segment typical point. Then, the distance calculation section 17 calculates a distance to an object using the position information of the extracted reflection point.

The second embodiment specifically described above is so configured that, if a bicycle has been detected as an object present ahead of the own vehicle, a reflection point on the rear end of the bicycle is extracted from the plurality of reflection points Q1 to Q5 detected by the radar device 21, and a distance to the object is calculated based on the extracted reflection point. With this configuration as well, a shortest distance to an object can be calculated with high accuracy by the radar device 21, for an object, such as a bicycle, having a narrow front or rear end made of metal and reflecting waves of low radio field intensity from the end. Furthermore, the distance to a reflection point detected by the radar device 21 is calculated as a distance to an object. Accordingly, a shortest distance to an object can be directly obtained using the actual reflection point data.

Other Embodiments

The present disclosure is not limited to the embodiments described above, but may be implemented as below, for example.

The first embodiment is configured to correct a radar-detected distance L based on a distance error ΔL by subtracting a distance correction amount A from the radar-detected distance L. However, configuration is not limited to this. For example, the radar-detected distance L may be ensured to be corrected based on a distance error ΔL by multiplying the radar-detected distance L by a correction coefficient (<1). It is preferable that the correction coefficient is made variable according to the height H of the target or the radar-detected distance L.

Instead of the configuration of making the distance correction amount A variable according to the height H of the target and the radar-detected distance L, the distance correction amount A may be ensured to be calculated according to either the height H of the target or the radar-detected distance L. Furthermore, the distance correction amount A may be a preset fixed value.

It may be so configured that the radar-detected distance L is determined as to whether it is not less than a predetermined distance, and if an affirmative determination is made, a distance to an object is calculated taking account of the positional displacement between a front or rear end of the bicycle, whichever is nearer to the own vehicle, and a detection point on the object obtained through search waves transmitted from the radar device 21. When an object is at a short distance, there is a probability that the distance to the rear end of the bicycle has already been detected as a radar-detected distance L. Conversely, when the object is at a far distance, there is a high probability that the radar-detected distance L includes a distance error ΔL. Considering this, the above configuration enables calculation of a distance to an object taking account of the above positional displacement, only when necessary.

Under the condition that the collision avoidance control is being performed, limitations may be ensured to be placed on the amount of change per unit time in distance to the object which is due to bicycle distance correction based on a distance error ΔL, until lapse of a predetermined time TM after start of the correction. With this configuration, under the situation that the occurrence of a distance discontinuity does not exert so much effects, a shortest distance to an object can be promptly obtained.

If the object present around the own vehicle is a bicycle in a longitudinal state relative to the own vehicle, the object should have a front or rear end with a narrow reflection surface and tends to exhibit low radio field intensity, and accordingly the waves reflected by the end may be removed as noise. In this regard, the second embodiment may be configured to change the threshold for removing noise from the radio field intensity of the reflected waves so that the noise is less likely to be removed, and then to calculate a distance to an object taking into account of a distance error ΔL.

Even when the bicycle is in a longitudinal state, the distance error ΔL is different between when the bicycle is obliquely oriented relative to the traveling direction of the own vehicle and when the bicycle is oriented parallel to the traveling direction of the own vehicle. Specifically, when the bicycle is obliquely oriented, the distance error ΔL is smaller compared to when the bicycle is oriented parallel to the traveling direction of the own vehicle. In view of this, it may be so configured that a distance correction amount A is calculated according to an angle α of the front-back direction of the bicycle relative to the traveling direction of the own vehicle. In this case, as the angle α becomes larger, the distance correction amount A is ensured to be made smaller.

In the first embodiment, the reflection point exhibiting highest radio field intensity is taken to be a segment typical point. However, the segment typical point (detection point) only has to be one point on a radar target, and the method of extracting a segment typical point is not limited to this. For example, instead of the configuration of extracting a segment typical point based on radio field intensity, the segment typical point may be taken to be the reflection point located at the center in the left-right direction, or the reflection point located at the left or right end, among the plurality of reflection points.

The above embodiments have been described taking the case where the radar device 21 and the imaging device 22 are installed in the front end of the own vehicle. However, the installation positions and the number of the radar device 21 and the imaging device 22 are not particularly limited. These devices may be applied to a system installed in the rear end or the side of the own vehicle. If the radar device 21 and the imaging device 22 are installed in the rear end of the own vehicle, a distance to an object can be calculated for a bicycle present behind the own vehicle taking account of the positional displacement between the front end of the bicycle and a detection point on the object obtained through search waves transmitted from the radar device 21. Thus, for a bicycle present behind the own vehicle as well, a shortest distance thereto from the own vehicle can be obtained with high accuracy.

The components described above are conceptual, and the present disclosure should not be limited to the embodiments described above. For example, the functions of a single component may be implemented by being distributed to a plurality of components, or the functions of a plurality of components may be implemented by a single component.

The present disclosure has so far been described based on some embodiments. However, the present disclosure should not be construed as being limited to these embodiments or the structures. The present disclosure should encompass various modifications, or modifications within the range of equivalence. In addition, various combinations and modes, as well as other combinations and modes, including those which include one or more additional elements, or those which include fewer elements should be construed as being within the scope and spirit of the present disclosure.

The invention claimed is:

1. An object detection apparatus that detects an object present around an own vehicle by using a radar device and an imaging device, comprising:
   a type recognition section that recognizes a type of the object, based on an image captured by the imaging device; and
   a distance calculation section that calculates a distance to the object in a case in which
      a single object is detected as the object by the imaging device and the radar device, and
      the object is recognized to be a bicycle by the type recognition section,
   wherein the distance to the object is calculated based on positional displacement between
      a first point on the object comprising a point located at a front end or a rear end of the object, whichever is nearer to the own vehicle, and
      a second point on the object comprising a detection point on the object obtained through search waves transmitted from the radar device.

2. The object detection apparatus according to claim 1, wherein the distance calculation section calculates the distance to the object by correcting a radar-detected distance that is a distance to the detection point, taking account of the positional displacement.

3. The object detection apparatus according to claim 2, further comprising a height calculation section that calculates a height of the object, based on an image captured by the imaging device, wherein
   the distance calculation section calculates a correction amount that reflects the positional displacement, based on a height of the object calculated by the height calculation section, and corrects the radar-detected distance, based on the correction amount calculated.

4. The object detection apparatus according to claim 2, wherein the distance calculation section makes a correction amount that reflects the positional displacement smaller, as the radar-detected distance becomes smaller.

5. The object detection apparatus according to claim 2, wherein:
   the object detection apparatus is applied to a vehicle equipped with a collision avoidance device which performs collision avoidance control for avoiding a collision between the object and the own vehicle or mitigating damage due to the collision, if it is determined that there is a high probability of occurrence of a collision between the object and the own vehicle, based on the distance to the object; and
   the type recognition section retains information associated with the type of the object at start of the collision avoidance control, while the collision avoidance control is performed.

6. The object detection apparatus according to claim 2, wherein the distance calculation section limits an amount of change per unit time of distance to the object, the amount of change being due to correction of the radar-detected distance, until a lapse of a predetermined time period after starting correction of the radar-detected distance.

7. The object detection apparatus according to claim 1, wherein the distance calculation section extracts a reflection point on the front end or the rear end of the bicycle, whichever is nearer to the own vehicle, from among a plurality of reflection points detected through the search waves being reflected from the object, and calculates the distance to the object, based on the reflection point.

8. The object detection apparatus according to claim 1, wherein, after start of calculating the distance to the object taking account of the positional displacement, the distance calculation section continues calculating the distance to the object taking account of the positional displacement even when the object is no longer detected by the imaging device, as long as the object is being continuously detected by the radar device.

9. An object detection method of detecting an object present around an own vehicle by using a radar device and an imaging device, comprising:

recognizing a type of the object, based on an image captured by the imaging device; and calculating a distance to the object in a case in which a single object is detected as the object by the imaging device and the radar device, and in which the object is recognized to be a bicycle by recognizing the type of the object, the distance to the object being calculated based on a positional displacement between a first point on the object comprising a point located at a front end or a rear of the object, whichever is nearer to the own vehicle, and a second point on the object comprising a detection point on the object obtained through search waves transmitted from the radar device.

* * * * *